L. B. YEISER.
THERMOSTAT SHOWER HEAD.
APPLICATION FILED OCT. 15, 1917.
1,303,140.
Patented May 6, 1919.
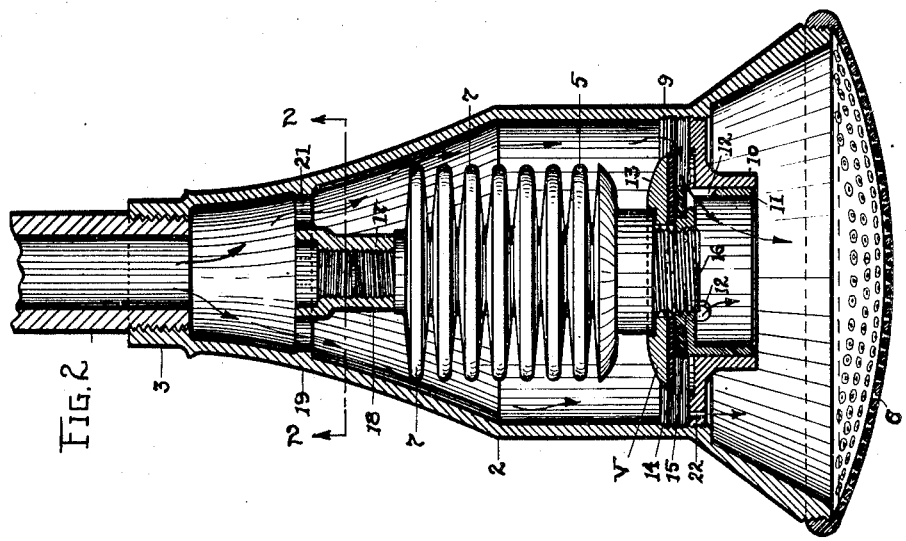
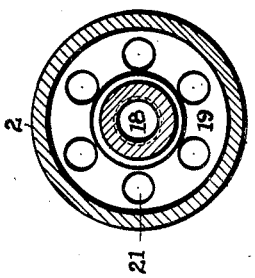
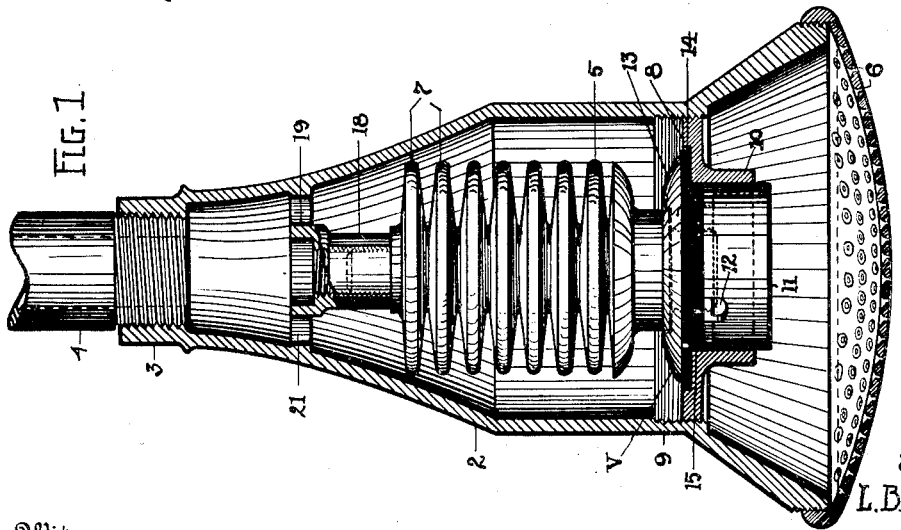
Inventor
L. B. Yeiser

UNITED STATES PATENT OFFICE.

LEON B. YEISER, OF CLEVELAND, OHIO, ASSIGNOR TO GLAUBER BRASS MANUFACTURING COMPANY, OF CLEVELAND, OHIO.

THERMOSTAT SHOWER-HEAD.

1,303,140.            Specification of Letters Patent.          Patented May 6, 1919.

Application filed October 15, 1917. Serial No. 196,570.

*To all whom it may concern:*

Be it known that I, LEON B. YEISER, a citizen of the United States, residing at Cleveland, in the county of Cuyahoga and State of Ohio, have invented certain new and useful Improvements in Thermostat Shower-Heads, of which the following is a specification.

This invention comprises an improvement in a thermostat shower head, whereby the delivery of warm or hot water to a bather may be regulated automatically and a flow of water too hot for comfort or safety prevented. The device is also designed with a view to simplicity and economy in construction, and of durability and effectiveness in operation; and embodies means for by-passing a small amount of water to promote effective operations.

In the accompanying drawings, Figure 1 is a view of the device, the head or hood being shown in section, with a side elevation of the thermostatic disks expanded and the valve closed. Fig. 2 is a view corresponding to Fig. 1, but showing the disks contracted and the valve open, the valve being also shown in section in this view. Fig. 3 is a transverse section in plan on line 2—2, Fig. 1.

The device comprises a bell-shaped casing 2 of cast metal, the reduced end 3 having internal screw-threads adapted to secure the device to a water-supply pipe 4, which in the case of a bath installation usually connects with a hot and cold water mixing valve or with two separate pipes supplying cold and hot water under suitable valve control. The difficulty of maintaining a constant flow of water at a uniform warm or hot temperature is understood generally, and this device is equipped with a valve V and a thermostatic member 5 to control the flow of water passing through the perforated nozzle or spraying cap 6 removably attached at the flaring bottom portion of the device. That is, if the water becomes too hot the thermostatic member 5, consisting of a series of connected hollow metal disks 7 containing an expansible liquid or gas, is expanded or elongated by the flow of hot water around the member, and the valve V is forced down upon the top of the screw-ring 8 which is adjustably secured within the lower end of the central enlargement 9 of the casing. This ring has a central tubular boss 10 within which a round and recessed extension 11 of valve 4 is adapted to play up and down to open or close the several ports 12 within the sides of the extension adjacent the upper flat seating surface of the ring. In effect, the valve is a double valve, comprising the flat disk 13 having a flat sealing washer of fiber 14 or other suitable material at its bottom, and which washer is supplemented by a smaller rubber or fiber washer 15 of the same diameter as the round extension 11 which is screwed upon the lower screw-stem 16 of the thermostatic member 5 in advance of the flat valve disk 13, thereby securing all said parts in working relation and place upon the thermostat member.

The recessed top surface of screw-ring 8 provides a valve seat, and rotation of this ring permits different working relations to be established with the valve members and an earlier or later closure of the ports dependent upon the temperature of the water desired, it being understood that the thermostat member 5 is otherwise fixed or held stationary within the casing as provided for by the upper screw stud 17 which is engaged with the screw-threaded projection 18 cast integral with the casing at the bottom of its perforated diaphragm or wall 19 within the upper flaring portion 20 of the casing directly beneath the water entrance. Several round openings 21 perforate wall 19 to permit a free flow and a uniform distribution of water on all sides of the thermostatic device 5.

I have also discovered that the device will operate more effectively and be safeguarded if a small amount of water be permitted to flow constantly, especially when the valve is fully closed, and to this end I have provided a relatively small orifice or outlet 22 in screw-ring 8, see Fig. 2. It must be borne in mind that this shower device is usually placed in a bath chamber or above a tub adapted to take care of all overflow of water, and that the main shut-off for the water is controlled by suitable valves in the pipe line as usual.

What I claim is:

1. A shower head having a tapering body portion and a series of expansible disks internally thereof and connected therewith, a valve member having an extension with water ports in its side and affixed to said disks to move therewith, and a valve seat for said valve member in adjustable screw-engagement with the walls of said head.

2. A shower head having a removable perforated enlarged cap at its bottom and a removable and adjustable valve seat adjacent the same within said head, a set of expansible members affixed at one end to said head internally thereof above said valve seat, a valve member affixed to said disks in co-acting relation with said valve seat, and said seat having a small passage for the escape of water to said perforated cap.

3. A device to regulate the flow of hot water through a water-supply pipe, comprising a chambered casing of substantially bell shape and having a valve seat in its larger lower portion, a thermostat removably supported at its upper end in the top portion of said casing, a valve affixed to the lower end of said thermostat adapted to said valve seat and to shut off the water in greater or lesser degree dependent upon the temperature thereof, and said casing having a relatively small permanently open outlet for the water to permit a slight flow of water constantly through the device.

Signed at Cleveland, in the county of Cuyahoga, and State of Ohio, this 14th day of July, 1917.

LEON B. YEISER.